United States Patent
Bergquist et al.

(10) Patent No.: US 10,009,789 B2
(45) Date of Patent: Jun. 26, 2018

(54) INACTIVITY HANDLING OF DEVICES WITH DELAY-TOLERANT TRAFFIC

(71) Applicant: Telefonaktiebolaget LM Ericsson (publ), Stockholm (SE)

(72) Inventors: Gunnar Bergquist, Kista (SE); Johnny Karlsen, Järfälla (SE); Patrick Lie Chin Cheong, Kanata (CA); Mauro Martins, Kanata (CA); Ahmed Nouah, Ottawa (CA); Landdy Zhang, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 174 days.

(21) Appl. No.: 15/115,447

(22) PCT Filed: May 17, 2016

(86) PCT No.: PCT/EP2016/061033
§ 371 (c)(1),
(2) Date: Jul. 29, 2016

(87) PCT Pub. No.: WO2016/184861
PCT Pub. Date: Nov. 24, 2016

(65) Prior Publication Data
US 2017/0150391 A1    May 25, 2017

Related U.S. Application Data

(60) Provisional application No. 62/163,677, filed on May 19, 2015.

(51) Int. Cl.
| | |
|---|---|
| *H04L 1/00* | (2006.01) |
| *H04W 28/02* | (2009.01) |
| *H04W 72/12* | (2009.01) |

(52) U.S. Cl.
CPC ... *H04W 28/0236* (2013.01); *H04W 28/0205* (2013.01); *H04W 72/1252* (2013.01)

(58) Field of Classification Search
CPC .............................................. H04W 28/0236
(Continued)

(56) References Cited

U.S. PATENT DOCUMENTS

| | | | |
|---|---|---|---|
| 2013/0155954 A1* | 6/2013 | Wang | H04W 4/70 370/328 |
| 2014/0226542 A1* | 8/2014 | Gupta | H04B 15/00 370/280 |

(Continued)

FOREIGN PATENT DOCUMENTS

| | | |
|---|---|---|
| EP | 2838304 A1 | 2/2016 |
| WO | 2016074913 A1 | 5/2016 |

OTHER PUBLICATIONS

3rd Generation Partnership Project, 3rd Generation Partnership Project; Technical Specification Group Radio Access Network; Evolved Universal Terrestrial Radio Access (E-UTRA); Physical layer procedures (Release 13), Technical Specification, 3GPP TS 36.213 V13.1.1, Mar. 1, 2016, pp. 1-44, 3GPP, France.

(Continued)

*Primary Examiner* — Shripal Khajuria
(74) *Attorney, Agent, or Firm* — Coats & Bennett, PLLC

(57) ABSTRACT

To relieve signaling congestion, UEs (30) having delay-tolerant data are moved more rapidly to the non UL synchronized state, freeing up PUCCH resources for users that have not indicated a delay-tolerance. In one embodiment, a resource conservative mode is defined for a UE (30) having delay-tolerant data (e.g., from a "background" app); otherwise, the UE (30) assumes a default mode. In one embodiment, the network sends the UE a pair of first and a second values (or indices to them) for a Time Alignment Timer, TAT (56, 66) in the UE (30). The first value—which is typically smaller than the second value—is used by the UE (30) in the resource conservative mode when the user data plane is internally concluded as being delay-tolerant or has already been confirmed to be delay-tolerant; the second value is used otherwise (i.e., in default mode). In the resource conservative mode, the shorter TAT value moves the UE from PUCCH more rapidly, and the UE (30) uses random access (Continued)

for infrequent scheduling requests. In the default mode, the UE (30) retains PUCCH and has low latency for scheduling requests. The network may preconfigure the pair of TAT values. The mechanism is furthermore capable of achieving a synchronized start of a TAT value, and also stopping any TAT (56, 66) that is running.

36 Claims, 10 Drawing Sheets

(58) Field of Classification Search
USPC .......................................................... 370/230
See application file for complete search history.

(56) References Cited

U.S. PATENT DOCUMENTS

2016/0128078 A1* 5/2016 Murthy ............. H04W 28/0205
370/329
2016/0242230 A1* 8/2016 Huang ................. H04W 72/12

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 13)", Technical Specification, 3GPP TS 36.321 V13.1.0, Mar. 1, 2013, pp. 1-85, 3GPP, France.

3rd Generation Partnership Project, "3rd Generation Partnership Project; Technical Specification Group Radio Access Network; Evolved Universal Terrestrial Radio Access (E-UTRA); Radio Link Control (RLC) protocol specification (Release 13)", Technical Specification, 3GPP TS 36.322 V13.1.0, Mar. 1, 2016, pp. 1-44, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 13)", Technical Specification, 3GPP TS 36.331 V13.1.0, Mar. 1, 2016, pp. 1-551, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 13)", Technical Specification, 3GPP TS 36.213 V13.1.0, Mar. 1, 2016, pp. 1-361, 3GPP, France.

Third Generation Partneship Program; "3rd Generation Partnership Project; Technical Specification Group Core Network and Terminals; Non-Access-Stratum (NAS) protocol for Evolved Packet System (EPS); Stage 3 (Release 13)," 3GPP TS 24.301 V13.1.0; XP050927892; Mar. 2015; pp. 1-384; Sophia-Antipolis Cedex, France.

Kumar Swamy Pasupuleti; "How LTE Stuff Works?: Multiple Timing Advances for uplink Carrier Aggregation;" Retrieved from the internet: URL: http://howltestuffworks.blogspot.nl/search/label/Timing Advance [retrieved on Aug. 4, 2015]; Oct. 28, 2014; pp. 1-5.

\* cited by examiner

```
- - ASN1START

TimeAlighmentTimer : := ENUMERATED {
                          sf500, sf750, sf1280, sf1920, sf2560, sf 5120,
                          sf10240, infinity
- - ASN1STOP
```

INACTIVITY HANDLING OF DEVICES WITH DELAY-TOLERANT TRAFFIC

RELATED APPLICATIONS

This application claims priority to U.S. Provisional patent Application Ser. No. 62/163,677 filed May 19, 2015, the disclosure of which is incorporated herein by reference.

TECHNICAL FIELD

The present invention relates generally to the field of wireless communications in a mobile communication network and in particular to the handling of uplink time alignment and data inactivity supervision of a device connected using the protocols of Long Term Evolution (LTE).

BACKGROUND

Wireless communication networks have evolved complex protocols to establish and maintain reliable connections between mobile user equipment (UE) and the network. Generally, the communications between UEs and the network comprise two types: signaling (also known as control plane communications), which are "overhead" communications used to control connectivity, transmission power, and technical features (e.g., modulation and coding); and IP data (also known as user plane communications), which comprise the content being communicated (e.g., digital voice, text, images, video, and the like). Both signaling and IP data transfer occur across the air interface, which has limited bandwidth.

Signaling congestion is a recurring difficulty in wireless communication networks. It is well known in large arena venues, but also occurs almost anywhere where large masses of people commute or gather. The scheduler weight of signaling is typically much higher than for IP data. The reasons for that are many, some are rational and based on concerns to not risk overloading some bottleneck resource; some are based on more traditional concerns and obligations to provide secure and overly reliable mechanisms for connection control and telecom lines.

When signaling congestion occurs, the capacity for IP data is drastically decreased, regardless of its initial size. The scheduling delay of IP data increases without limit, and very rapidly the system throughput of IP data can be severely if not completely throttled. The signaling congestion itself increases rapidly from an exponential increase of various types of high priority signaling aiming to maintain or re-establish connectivity over the congested air interface, all of which further represses IP data. Packets are delayed and also largely fragmented on the Layer 2 level in the course of these events. There are discouraging observations from radio based mobile communication networks where as little as a 10-byte chunk of a 1500-byte packet is consecutively scheduled every 50th up to 150th ms, while at the same time there is a delay budget of 300 ms for the packet itself. However, from the viewpoint of the radio-based scheduler and data transport layers, nothing appears abnormal. In fact, it is one of the main features of data transport and adaption layers, such as the Layer 2 Radio Link Protocol (RLC) and Medium Access Protocol (MAC) of 3GPP LTE, to fragment and adapt incoming IP data to whatever sizes and formats can be sustained over a congested radio channel (RLC is specified in 3GPP TS 36.322; MAC in 3GPP TS 36.321).

Many current methods attempting to address signaling congestion focus on preempting low priority IP bearers, and UEs with such bearers, and ultimately removing associated services from the system. However, preemption only serves to perpetuate the problem, since devices will try to re-establish, and will continue to request service and data transmission resources. The network interactions are built on standards such as MAC, RLC, RRC, and TCP, which use persistent retransmission and re-establishment methods, all of which will further increase the signaling. Accordingly, preemption effectively transforms users that are known to use low-priority IP bearers into users with high-priority signaling.

Among the more drastic methods to handle signaling congestion are those that stop admitting users of low-priority IP bearers, or bar users from attempting to access if they only have delay-tolerant data. There are numerous deficiencies to such a strategy. The latency in idle mode is large; it takes time to set up a new control plane whenever user data appears which is not delay-tolerant. There is also an inherent inconsistency with a strategy that aims to combat signaling congestion, which must continuously reestablish control planes and rely on signaling to achieve that. A better approach would be to maintain the connection, but use methods that relax the pressure on resources used for signaling.

UEs may schedule uplink (UL) transmissions in two ways. A UE that is UL synchronized may send a scheduling request on the Physical Uplink Control Channel (PUCCH), and receive from the network a grant to use the Uplink Shared Channel (UL-SCH) for dedicated data transmission. The PUCCH resources improve UL and DL throughput and reduce latency, but are available only in limited amounts. For highly loaded systems, it is beneficial to only have a subset of the RRC Connected UEs in the cell be UL synchronized—ideally, those with data transfers or requests that are not delay-tolerant.

Alternatively, a UE with delay-tolerant data or requests may allow its UL synchronization to lapse, and gather, or coalesce, its transmissions. When the UE is ready to perform a significant amount of data transfer, it may regain UL synchronization by use of the Random Access Channel (RACH). While this process takes longer for the UE to reestablish connectivity, if it has only delay-tolerant traffic there is no deleterious effect to the user, and the network is relieved of signaling congestion between the UE's connection sessions.

Hence, it is advantageous for the network to keep UEs having traffic that is not delay-tolerant UL synchronized and able to access PDCCH to schedule transmissions with minimal latency. It is also advantageous for the network to more rapidly move UEs having delay-tolerant traffic out of UL synchronization to relieve the signaling load, and allow them to infrequently establish connectivity via RACH. How long a UE remains UL synchronized between data transmissions across the air interface is controlled by the Time Alignment Timer (TAT) value, which is typically a few seconds.

With the growth of internet communications generally, and the proliferation of modern "smartphones," much traffic across the air interface is mobile internet access, much of which is both uplink-driven (e.g., a browser sending a request to a web server) and delay-tolerant. Indeed, many apps driving UL traffic operate as "background" tasks. In contrast, "foreground" apps, such as voice communications, video or audio streaming, and the like, are not delay-tolerant. Accordingly, the UE is often in the best position to determine if its traffic is delay-tolerant or not, and may utilize this knowledge to trend toward either RACH or PDCCH access, respectively, to help alleviate network signaling congestion in an intelligent manner.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, UEs having delay-tolerant data are moved more rapidly to the non UL synchronized states, freeing up PUCCH resources for users that have not indicated a delay-tolerance. In one embodiment, a resource conservative mode is defined for a UE having delay-tolerant data (e.g., from a "background" app); otherwise, the UE assumes a default mode. In one embodiment, the network sends the UE a pair of first and a second values (or indices to them) for a Time Alignment Timer (TAT) in the UE. The first value—which is typically smaller than the second value—is used by the UE in the resource conservative mode when the user data plane is internally concluded as being delay-tolerant or has already been confirmed to be delay-tolerant; the second value is used otherwise (i.e., in default mode). In the resource conservative mode, the shorter TAT value moves the UE from PUCCH more rapidly, and the UE uses random access for infrequent scheduling requests. In the default mode, the UE remains longer with PUCCH and as such has low latency for scheduling requests. The network may preconfigure the pair of TAT values. The mechanism is furthermore capable of achieving a synchronized start of a TAT value, and also stopping any TAT that is running.

One embodiment relates to a method of operating User Equipment in a wireless communication network. Whether or not pending data transfers or requests to the network are delay-tolerant is determined. An indication of first and second values for a Time Alignment Timer is received from the network, wherein the first value indicates a shorter duration than the second value. If the data is delay-tolerant, the first value is applied to a Time Alignment Timer. If the data is not delay-tolerant, the second value is applied to the Time Alignment Timer.

Another embodiment relates to a UE operative in a wireless communication network. The UE includes a transceiver operative to exchange signaling and data with the network. The UE also includes a Time Alignment Timer, and one or more processing circuits operatively connected to the transceiver and operative to execute applications. The processing circuit is further operative to determine whether pending data transfers or requests to the network are delay-tolerant or not; receive from the network an indication of first and second values for the Time Alignment Timer, wherein the first value indicates a shorter duration than the second value; if the data is delay-tolerant, apply the first value to the Time Alignment Timer; and if the data is not delay-tolerant, apply the second value to the Time Alignment Timer.

Yet another embodiment relates to a method of managing signal congestion by a node in a wireless communication network. One or more UEs having delay-tolerant data and data requests are identified. The identified delay-tolerant UE is placed in a resource conservation mode whereby it releases uplink channel resources and makes infrequent requests for coalesced data transfers by random access.

Still another embodiment relates to a node operative in a wireless communication network. The node includes a transceiver operative to exchange signaling and data with at least one UE. The node also includes one or more processing circuits operatively connected to the transceiver. The processing circuit is operative to identify one or more UEs having delay-tolerant data and data requests; and place the identified delay-tolerant UE in a resource conservation mode whereby the UE releases uplink channel resources and makes infrequent requests for coalesced data transfers by random access.

Still another embodiment relates to a UE operative in a wireless communication network, and including processing circuits. The processing circuits include a determining unit configured to determine whether pending data transfers or requests to the network are delay-tolerant or not; a receiving unit configured to receive from the network an indication of first and second values for a Time Alignment Timer, wherein the first value indicates a shorter duration than the second value; and a TAT value applying unit configured to apply the first value to the Time Alignment Timer if the determining module determines that pending data transfers or requests to the network are delay-tolerant, and further configured to apply the second value to the Time Alignment Timer if the determining module determines that pending data transfers or requests to the network are not delay-tolerant.

Still another embodiment relates to a UE operative in a wireless communication network. The UE includes a determining module configured to determine whether pending data transfers or requests to the network are delay-tolerant or not; a receiving module configured to receive from the network an indication of first and second values for a Time Alignment Timer, wherein the first value indicates a shorter duration than the second value; and a TAT value applying module configured to apply the first value to the Time Alignment Timer if the determining module determines that pending data transfers or requests to the network are delay-tolerant, and further configured to apply the second value to the Time Alignment Timer if the determining module determines that pending data transfers or requests to the network are not delay-tolerant.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

The physical capacity of a mobile communication network depends on a number of resources; a vital one is used for the Physical Uplink Control Channel (PUCCH). One main purpose of PUCCH is to provide a dedicated channel resource for User Equipment (UE) to request from the network a grant to use the Uplink Shared Channel (UL-SCH) for dedicated data transmission. A UE may send a scheduling request (SR) as a dedicated SR (D-SR) on such a PUCCH resource, or it may send it as random access SR (RA-SR) by using the random access (RA) procedure. If the system exhausts its PUCCH resources by methods promoting or allowing wasteful use of the PUCCH, the UEs must continuously reiterate random access to resynchronize and request resources. This is not only a more tedious and time consuming procedure, compared to sending an SR over PUCCH, but it also places an increased load on the resources for random access, which in turn limits the physical capacity of the network.

Figures 1, 2:
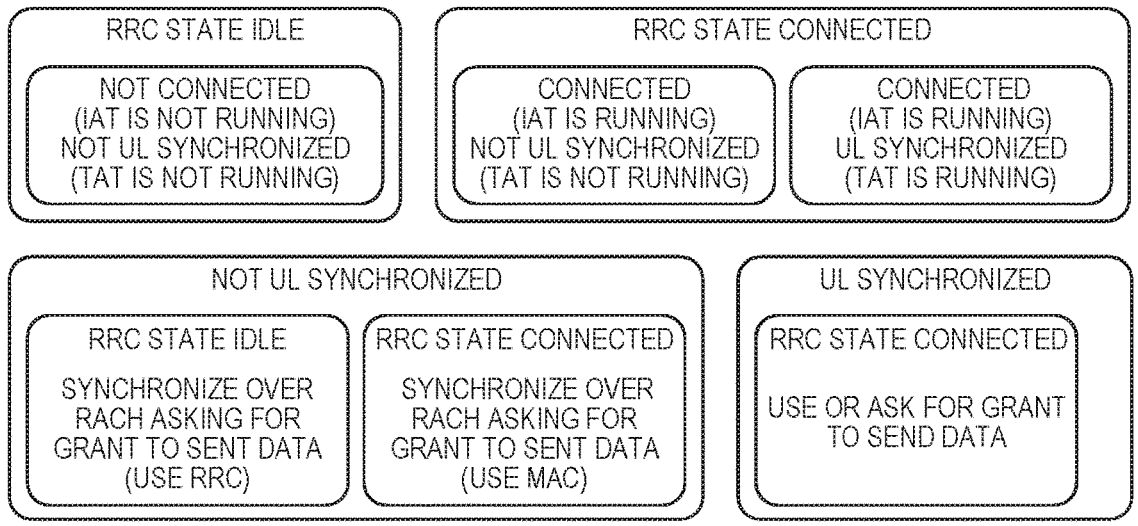
FIG. 1 depicts various UE states.
FIG. 2 is a TimeAlignmentTimer (TAT) information element specification.

A UE can be considered to be UL synchronized with the network, or not UL synchronized. In Long Term Evolution (LTE), uplink transmissions are only allowed when the UE is synchronized in the uplink. If a UE is not synchronized in the uplink, it must synchronize by using the random access procedure before it is allowed to transmit anything other than a preamble. FIG. 1 depicts various UE states, connectivity, and synchronization. The upper row groups the various connected/synchronized modes under the UE RRC state (e.g., Idle or Connected). The lower row gives the reverse view—which RRC states exist for the two possibilities of UL synchronization.

A UE will lose UL synchronization when the system stops maintaining its UL time alignment. If that happens, the UE releases any semi-static PUCCH resources (used for SR, CQI) that it may have (transition: UL synchronized to Not UL synchronized).

The Time Alignment Timer (TAT) is used by the network to supervise inactivity and regulate the number of users that are active and need to be synchronized, or inactive and do not need to be synchronized. The timer is restarted at reception of the Timing Advance Command (TAC). The network transmits TAC as long as UL data transmission is expected to occur. The UE is moved to Not UL synchronized when the timer expires, since no new uplink or downlink data transfers are immediately anticipated.

The network uses Radio Resource Control (RRC) to configure TAT in the UE, and it is set to a value less than 10 s, e.g., typically a few seconds. FIG. 2 depicts the header of a TimeAlignmentTimer information element in 3GPP 36.331 (E-UTRA RRC).

3GPP TS 36.321, clause 5.2, specifies the following actions occur upon expiry of the TimeAlignmentTimer:

"The UE shall when ( . . . ) timeAlignmentTimer expires:
( . . . )
flush all HARQ buffers for all serving cells;
notify RRC to release PUCCH/SRS for all serving cells;
clear any configured downlink assignments and uplink grants;
. . . "

Pending U.S. patent application Ser. No. 14/895,293, titled, "Discontinuous Operation for Devices with Background Traffic," filed Dec. 12, 2015 (claiming priority to Provisional Application 62/79039, filed Nov. 13, 2014) is incorporated herein by reference in its entirety. Embodiments described herein build and expand on concepts described in that application. For example, the '293 application describes that much of concurrent traffic in modern 3GPP networks is mobile internet traffic and as such is UL triggered—e.g., an app on a UE sends a request over the 3GPP network to download some content from an internet server. There is a substantial amount of idle time in between such requests, particularly if the app is running in the "background," as these apps tend to be highly delay-tolerant. Additionally, future networks may be dominated by traffic from a very large number of low-complexity Machine Type Communications (MTC) devices and/or Narrowband Internet of Things (NB-IoT), much of which will also be UL triggered. These devices are typically of the type that only rarely need to be reached, but which more often need to send a delay-tolerant metric (e.g., a utility meter reading) to an MTC or NB-IoT server. In both cases, network signaling congestion may be alieved if the UE/MTC/NB-IoT device were to more quickly lose UL synchronization, and rely on RACH for infrequent communications.

According to embodiments described herein, it is possible for the network to separate "background" users from "foreground" users, with regards to the maintenance of the uplink time alignment, in an autonomous way. In particular, a shorter timer value is used by the device and the network as the time alignment timer (TAT) when the user plane has been confirmed by both sides to be delay-tolerant, and a longer timer value is used as the TAT otherwise. Moreover, the shorter timer (or a derivate of it) can be used as a guard timer to initially and internally confirm delay-tolerance (i.e., "background" usage) in the UE.

One embodiment uses two modes of operation in connected mode in the most resource efficient way. In a resource conservative mode, the UE does not have PUCCH, and it is either inactive or coalesces data and data requests for delay-tolerant applications, and then uses random access for infrequent scheduling requests. As used herein, to "coalesce" data or data requests refers to the ability to hold off non-critical data transfers, and merge data across multiple sockets into a single access procedure. In another mode, wherein the UE monitors PDCCH more often, the UE has PUCCH and can continuously request to be scheduled with short latency.

In the resource conservative mode, wherein the user plane is either inactive or confirmed delay-tolerant and can be managed by coalescing methods in the UE, it can be expected that the number of accesses will be reduced and thereby the number of RACHes will be kept low. There are observations that indicate that up to 50% of mobile network connections are caused and used by applications running in "background." In the second mode, more frequent accesses can be expected due to a lower potential of coalescing and the reservation of an access resource can be justified.

Embodiments of the present invention present at least two advantages. They provide Quality of Experience (QoE) benefits such as decreased latency and extended battery lifetime, which can be exploited by the suppliers of devices and applications. Additionally, they create high capacity values that can be exploited by the suppliers and operators of network equipment. Much of the physical capacity of a loaded mobile communication network is tied up by connections that are either not scheduled at all, or are handled with much throttling and fragmentation. Embodiments of the present invention make it possible for the network to increase the utilization by regulating the number of users that are synchronized or not synchronized.

Embodiments enable the network to treat two types of traffic situations differently in an autonomous way: the "background" users can more quickly be moved to resource conservative mode, while the "foreground" users reside longer in the PUCCH consuming mode. In one embodiment the move into the resource conservative mode becomes completely autonomous by the timer expiration, without having to explicitly signal a transfer back to the resource conservative mode each time a data transaction has occurred.

In the following actions, Dn corresponds to a device action; Nn corresponds to a network action. This Dn, Nn numbering is utilized in FIGS. 3-7.

The UE modem uses a method that comprises the following Dn steps (not necessarily in this order, and not necessarily performing all steps in any given procedure):

D1. Receiving a control message with a Time Alignment Timer (TAT) in the configuration of MAC for signaling and data radio bearers (this is a known step, listed here for completeness).

D2. The TAT value is treated as a default value to be used when no other TAT values have been received. Two modes of operation are then established in connected state. The first mode is a resource conservative mode, wherein the UE does not have PUCCH, and wherein it performs coalescing of data and data requests for delay-tolerant applications and uses random access for infrequent scheduling requests. In a second mode, the UE monitors PDCCH more often, has PUCCH, and can continuously request to be scheduled with short latency. A protocol between the UE and network supports a continuous adjustment of the Discontinuous Reception (DRX) configuration in those two modes of operation, based on continuous measurements and reporting of confirmed delay-tolerance.

D3. The UE receives a control message with an index to a pair of first and second preconfigured values of the TimeAlignmentTimer (TAT). The UE treats the first value as the TAT to be used in situations wherein the user data plane has been confirmed and indicated to be delay-tolerant, and where the device could do coalescing of data and data requests for delay-tolerant applications. The UE treats the second value as the TAT to be used otherwise.

D4. The UE also treats the first value (or a derivate of the first value) as an internal guard timer to confirm delay-tolerance, after internal notification of upper layer coalescing.

D5. The UE continuously monitors the content of its data buffers and the requirements from over-the-top foreground and background applications, and sends messages to the network to indicate changes in confirmed delay tolerance.

D6. The UE continuously receives responsive messages from the network that control which mode of operation shall be used; a first resource conservative mode for situations wherein the user data plane has been indicated and confirmed to be delay-tolerant and where the UE should coalesce data and data requests for delay-tolerant applications, or a second mode to be used otherwise.

D7. The UE commits to a new TAT value when the next Timing Advance Command (TAC) is received and the TAT shall be restarted.

D8. The UE transmits a request message to indicate a desire to stop the TAT, receiving in response a control message with an indicator to act as if TAT has expired. The UE then commits to the action at an instance after an acknowledgement (ACK) for the control message transaction is received.

D9. The UE transmits a request message to indicate a desire for a certain pair of TAT values, and receiving responsive messages that control which pair shall be used.

The mobile network uses a method that comprises the following Nn steps:

N1. Same as D1 but instead transmitting a control message.

N2. Same as D2.

N3. Same as D3 but instead transmitting the control message to control which pair of TATs shall be used.

N4. void (D4 is internal in the device modem. No corresponding action in mobile network).

N5. The network receives messages from the device, optionally also using service layers in the network, and concluding current delay tolerance and the optimal mode of UE operation. N6. Same as D6 but the network transmits the control message to indicate which mode of operation shall be used.

N7. Same as D7 but instead transmitting the next TAC.

N8. Same as D8 but the reverse operation (receiving a request message and transmitting a responsive control message).

N9. Same as D9 but the reverse operation (receiving a request message and transmitting a responsive control message).

Figure 3:
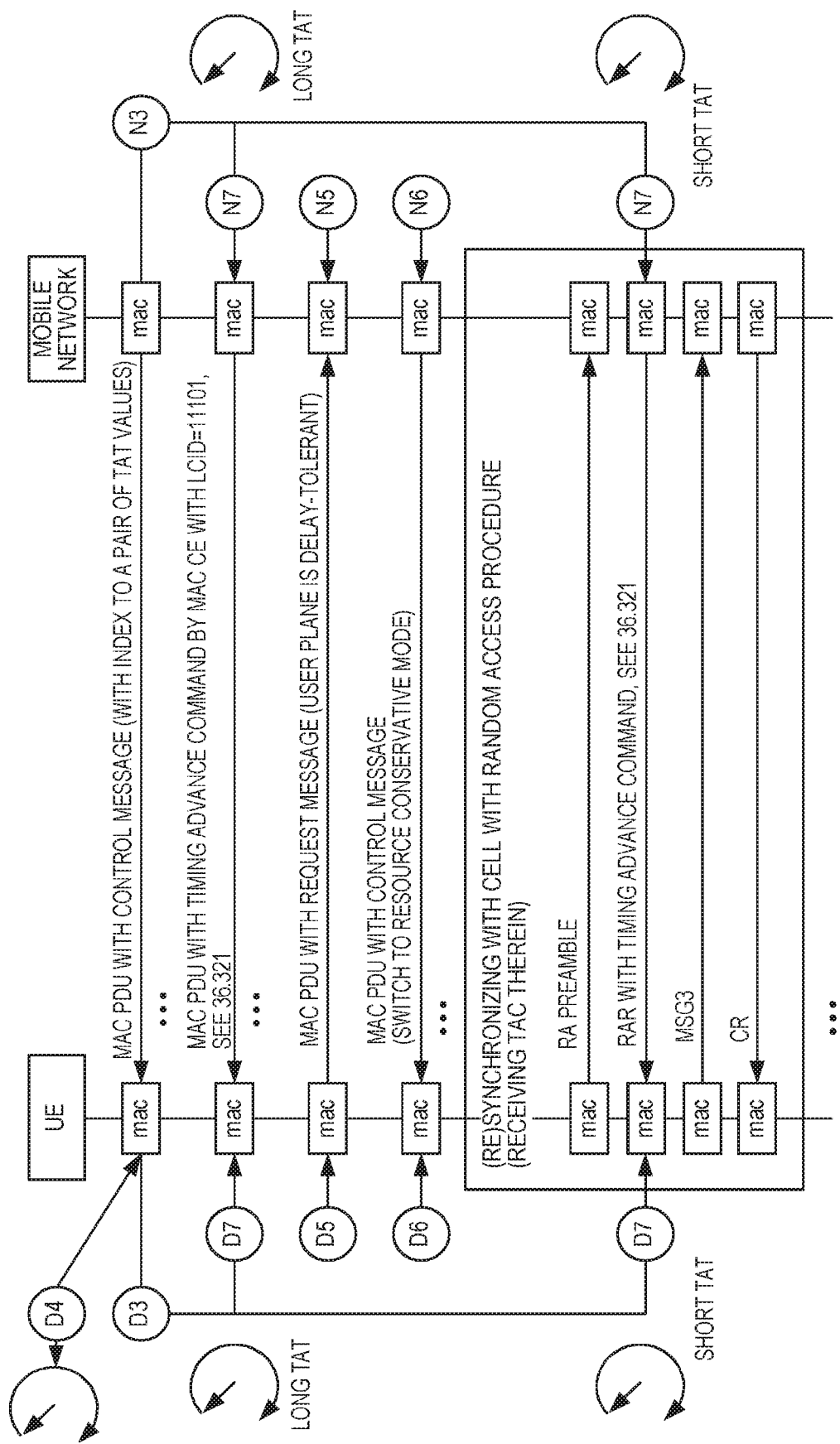
FIG. 3 is a signaling diagram demonstrating a switch from a long to a short TAT.

FIG. 3 illustrates a UE and network node cycling through some of these states in a scenario wherein the UE mode changes from a normal mode to a resource conservation mode, with a concomitant change in TAT value used by the UE.

Initially, at N3/D3, the network sends (and the UE receives) a control message with an index to a pair of first and second preconfigured values of the TAT. The UE also uses the first TAT value (or a derivate of it) as an internal guard timer, to confirm delay-tolerance of its uplink communications, as indicated by D4. At this point, the UE has not indicated that its need for uplink communications is delay-tolerant.

Some time later (as indicated by ellipses), at N7/D7, the network sends (and the UE receives) a Timing Advance Command (TAC) on the DL-SCH. The TAC is identified by a Logical Channel ID of 11101, as specified in Table 6.2.1-1 of 3GPP TS 36.321, the disclosure of which is incorporated herein by reference in its entirety. Upon receipt of the TAC, the UE commits to the second, longer, value of TAT, to remain in connected state longer and maintain rapid UL scheduling via PUCCH. The TAT is also restarted.

After another indefinite delay, the US concludes that its user plane communication is delay-tolerant—for example, most or all of its apps are running in background mode. At D5/N5, the UE sends (and the network receives) a message informing the network that the UE may be moved to a resource conservative mode. The network responds, at N6/D6 with a control message directing the UE to switch to resource conservative mode. In response, the UE begins to coalesce data and data requests for its delay-tolerant applications, and releases PUCCH, losing UL synchronization.

When the UE has gathered sufficient delay-tolerant UL data to justify a scheduling request, it resynchronizes with the network using the random access procedure, as well known in the art. At N7/D7, the network sends (and the UE receives) a Random Access Response with a TAC directing the UE to use the first, shorter TAT value. In response to the TAC, the UE switches to the shorter TAT value, and restarts the TAT. Following known signaling, the UE then sends a MSG3 scheduling request with the UEID, and the network responds with a Contention Resolution message. Further signaling is conventional.

FIG. 3 demonstrates a UE initially placed in "normal" mode by the network—remaining in UL synchronized state and using the longer value of TAT for delay-sensitive UL scheduling. When the UE determines that its UL traffic is delay-tolerant (e.g., by using the short TAT timer value as a guard timer), it informs the network, and moves to a resource conservative mode upon receiving a TAC from the network. From that point on (as long as its UL traffic remains delay-tolerant), the UE uses the Random Access procedure to schedule UL transmissions.

Figure 4:
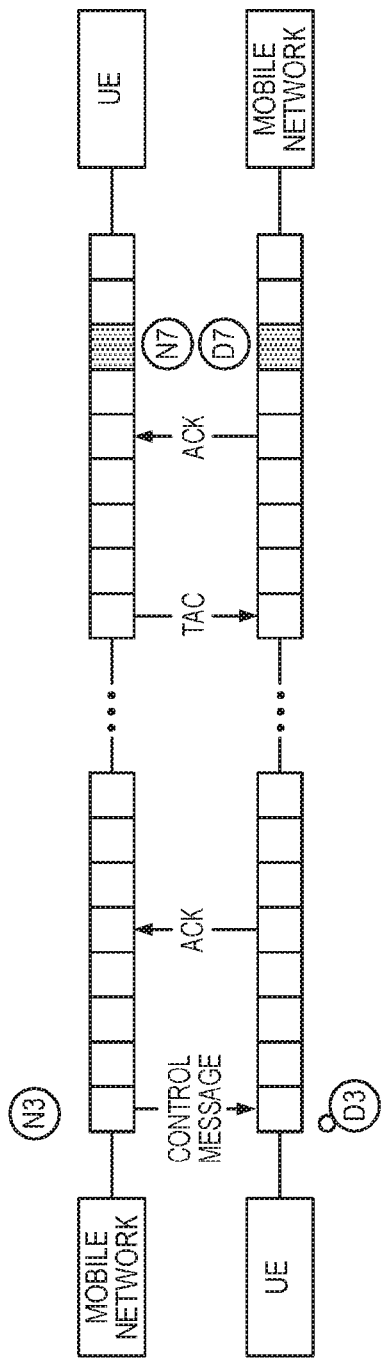
FIG. 4 is a state diagram depicting TAT activation communication and timing.

FIG. 4 is a state diagram depicting the subframe timing of the UE transition into or out of resource conservative mode. The network sends (and the UE receives) a control message at N3/D3, e.g., providing two timer values and/or directing the UE to utilize one of them as the TAT value. The UE acknowledges (ACK) the control message four subframes later (the round trip time, or RTT). However, the UE does not actually change mode and implement the TAT value and until it receives a TAC from the network. The UE ACKs the TAC four subframes later. Due to legacy timing, the network and UE agree that the actual change of state of the UE (and reset of the TAT) will occur six subframes after the TAC, at D7/N7. See 3GPP TS 36.213, § 4.2.3 ("For a timing advance command received on subframe n, the corresponding adjustment of the uplink transmission timing shall apply from the beginning of subframe n+6.").

Figure 5:
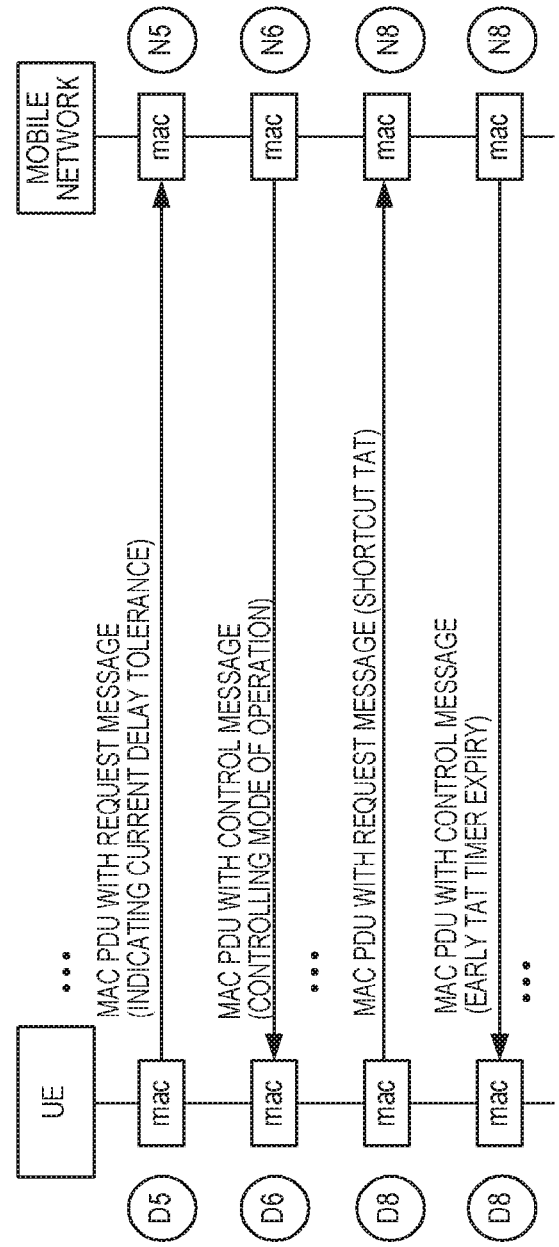
FIG. 5 is a signaling diagram depicting a UE request to terminate the TAT.

FIG. 5 is a signaling diagram depicting the operation of steps D8 and N8: the UE requests that the TAT be terminated early. At D5/N5, the UE sends (and the network receives) a request message indicating that the UE UL traffic is delay-tolerant (e.g., only background apps are active). The network responds, at N6/D6, with a control message directing the UE to enter resource conservative mode. At D8/N8, the UE sends (and the network receives) a request message asking to shortcut the TAT. In response, also in step N8/D8, the network sends (and the UE receives) a control message directing the UE to force the TAT timer to expire, thus immediately losing UL synchronization. To schedule UL transmissions after this, the UE must use Random Access procedure.

Figure 6:
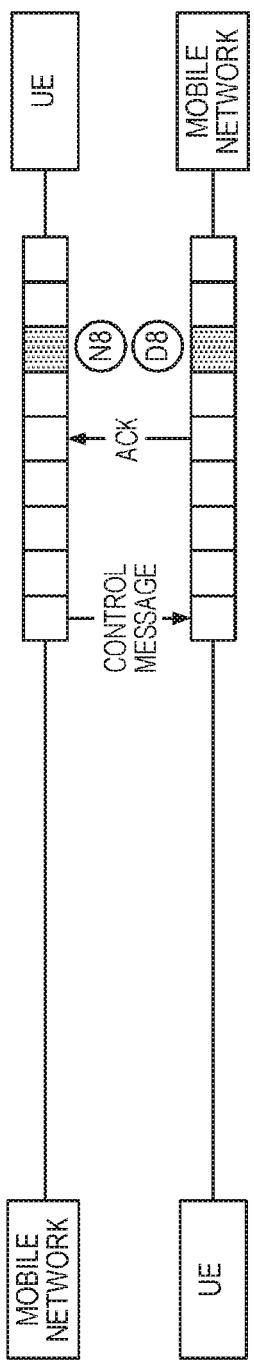
FIG. 6 is a state diagram depicting TAT termination communication and timing.

FIG. 6 is a state diagram depicting the timing of the last transaction depicted in FIG. 5. The network sends the UE a control message directing an early TAT timer expiry. Four subframes later, the UE sends the network and ACK. Two subframes after that, the UE terminates the value of its TAT timer.

Figure 7:
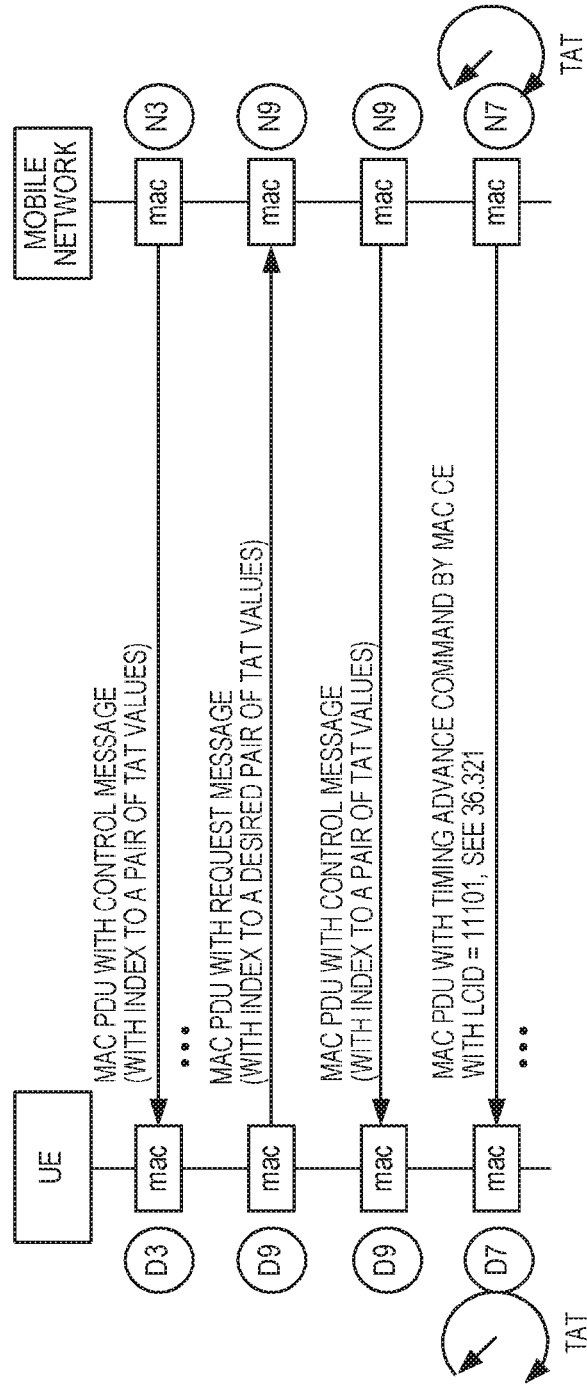
FIG. 7 is a signaling diagram depicting a UE requesting TAT values.

FIG. 7 is a signaling diagram depicting the operation of steps D9 and N9: the UE requests a particular pair of TAT values. At D3/N3, the network sends (and the UE receives) a control message with an index to a pair of TAT values for the UE to use. The UE responds, at D9/N9, with a request message indexing a pair of TAT values that the UE desires to use. At N9/D9, the network responds with a control message indexing the requested pair of TAT values. At N7/D7, the network sends the UE a TAC commanding it to either normal or resource conservative mode, and to adopt a corresponding TAT value from the pair, and to reset the TAT. As described above, the UE will execute these actions six subframes later.

Figure 8:
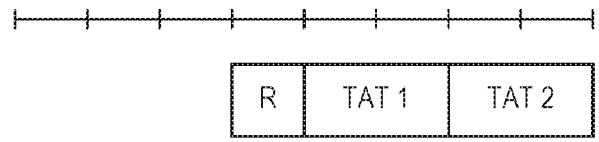
FIG. 8 depicts a control message structure.

FIG. 8 depicts a control message with possible coding of the index to paired TAT values. This illustrates a possible coding of the index in D3/N3 (as well as D9/N9), where each TAT index is 2 bits. Table 1 lists a possible representation of TATDEF as an index to a pair of TAT values.

TABLE 1

| TAT values, indexed by TAT | | | |
|---|---|---|---|
| TAT1 | TAT2 | Short TAT[1,2] $PC = X^3$ or $PC = 1^4$ | Long TAT[1,2] $PC = 0^4$ |
| 00 | 01 | sf1280 | sf2560 |
| 00 | 10 | sf1280 | sf5120 |
| 00 | 11 | sf1280 | sf10240 |
| 01 | 10 | sf2560 | sf5120 |
| 01 | 11 | sf2560 | sf10240 |
| 10 | 11 | sf5120 | sf10240 |
| other combinations are Reserved | | | |
| 11 | 11 | default[5] | |

[1] First (Short TAT) and second (Long TAT) preconfigured value of TAT. Units in subframes (1 ms in LTE).
[2] Long TAT is used when PC = 0; Short TAT is used otherwise.
[3] PC = X: default while delay tolerance is unknown.
[4] PC = 1: signaled as confirmed delay tolerant; PC = o otherwise.
[5] The value(s) configured by Non-PFT legacy (RRC) shall be used.

Figure 9:
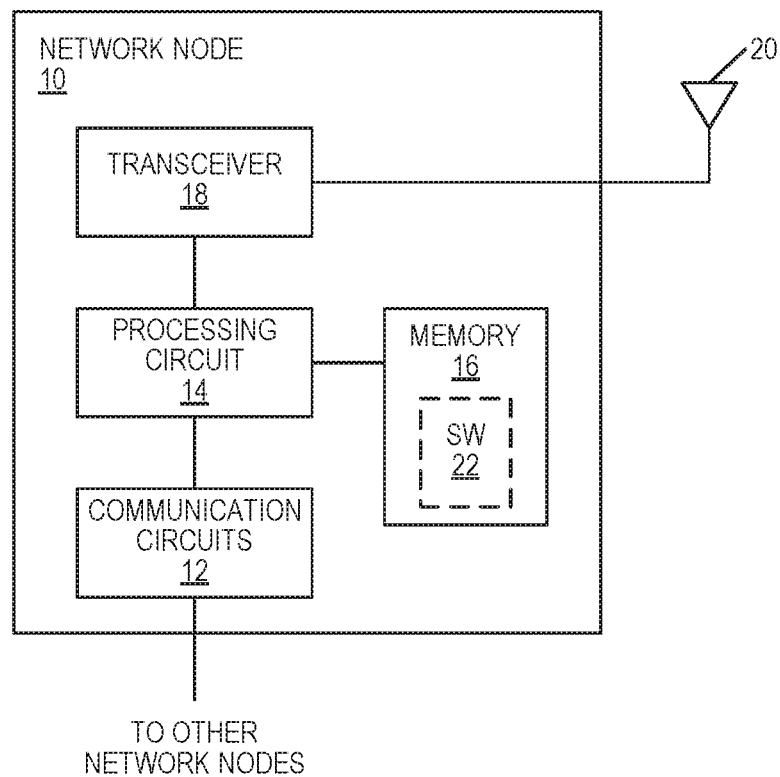
FIG. 9 is block diagram of a network node.

FIG. 9 depicts a network node 10 operative in embodiments of the present invention. In some embodiments, the network node 10 may be a base station. As those of skill in the art are aware, a base station 10 is a network node providing wireless communication services to one or more UE in a geographic region (known as a cell or sector). The base station 10 in LTE is called an e-NodeB or eNB; however the present invention is not limited to LTE or eNBs. In other embodiments, the network node 10 could be a node different than a base station. The network node 10 includes communication circuits 12 operative to exchange data with other network nodes; one or more processing circuits 14; memory 16; and radio circuits, such as a transceiver 18, one or more antennas 20, and the like, to effect wireless communication across an air interface to one or more UE.

According to embodiments of the present invention, the memory 16 is operative to store, and the processing circuit is 14 operative to execute, software 22 which when executed is operative to cause the network node 10 to send a pair of first and second values for a Time Alignment Timer to one or more UEs, and direct one or more UEs to enter either a resource conservative mode or default mode, respectively, as described herein.

Figure 10:
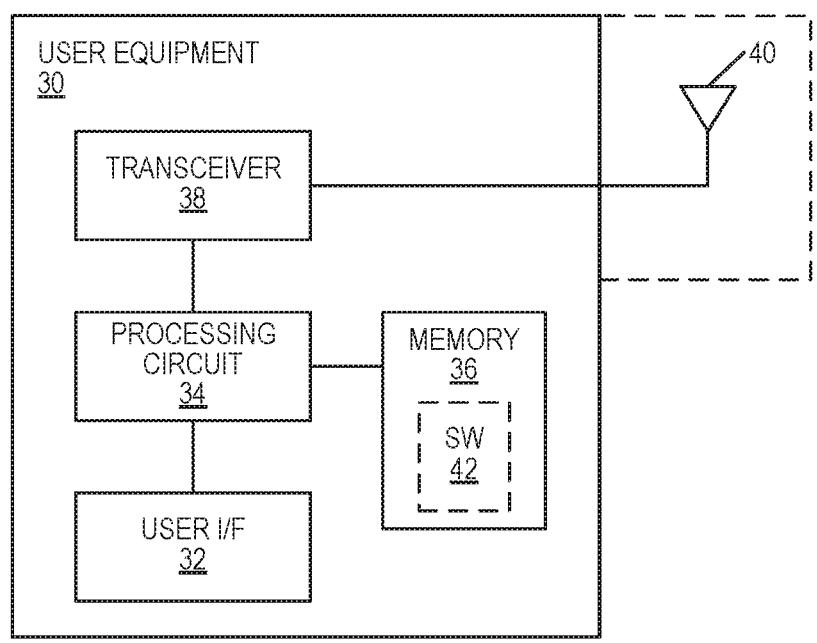
FIG. 10 is a block diagram of User Equipment.

FIG. 10 depicts a UE 30 operative in embodiments of the present invention. As those of skill in the art are aware, a UE 30 is a device, which may be battery-powered and hence mobile, operative within a wireless communication network. The UE 30 includes a user interface 32 (display, touchscreen, keyboard or keypad, microphone, speaker, and the like); one or more processing circuits 34; memory 36; and radio circuits, such a transceiver 38, one or more antennas 40, and the like, to effect wireless communication across an air interface to one or more network nodes 10. As indicated by the dashed line, the antenna(s) 40 may be external to the UE housing, or may be internal (e.g., as in most smartphones). The UE 30 may additionally include features such as a camera, removable memory interface, short-range communication interface (Wi-Fi, Bluetooth, and the like), wired interface (USB), battery recharge port, and the like (not shown in FIG. 10).

According to embodiments of the present invention, the memory 36 is operative to store, and the processing circuit is 34 operative to execute, software 42 which when executed is operative to cause the UE 30 to monitor the delay tolerance of data and data requests, and to apply a first or second value for a Time Alignment Timer to enter a resource conservative mode or default mode, respectively, as described herein.

The processing circuits 14, 34 may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 16, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The radio circuits may comprise one or more transceivers 18, 38 used to communicate with one or more other transceivers 38, 18 via a Radio Access Network according to one or more communication protocols known in the art or that may be developed, such as IEEE 802.xx, CDMA, WCDMA, GSM, LTE, UTRAN, WiMax, or the like. The transceiver 18, 38 implements transmitter and receiver functionality appropriate to the Radio Access Network links (e.g., frequency allocations and the like). The transmitter and receiver functions may share circuit components and/or software, or alternatively may be implemented separately.

The communication circuits 12 may comprise a receiver and transmitter interface used to communicate with one or more other nodes over a communication network according to one or more communication protocols known in the art or that may be developed, such as Ethernet, TCP/IP, SONET, ATM, or the like. The communication circuits 12 implement receiver and transmitter functionality appropriate to the communication network links (e.g., optical, electrical, and the like). The transmitter and receiver functions may share circuit components and/or software, or alternatively may be implemented separately.

Figure 11:
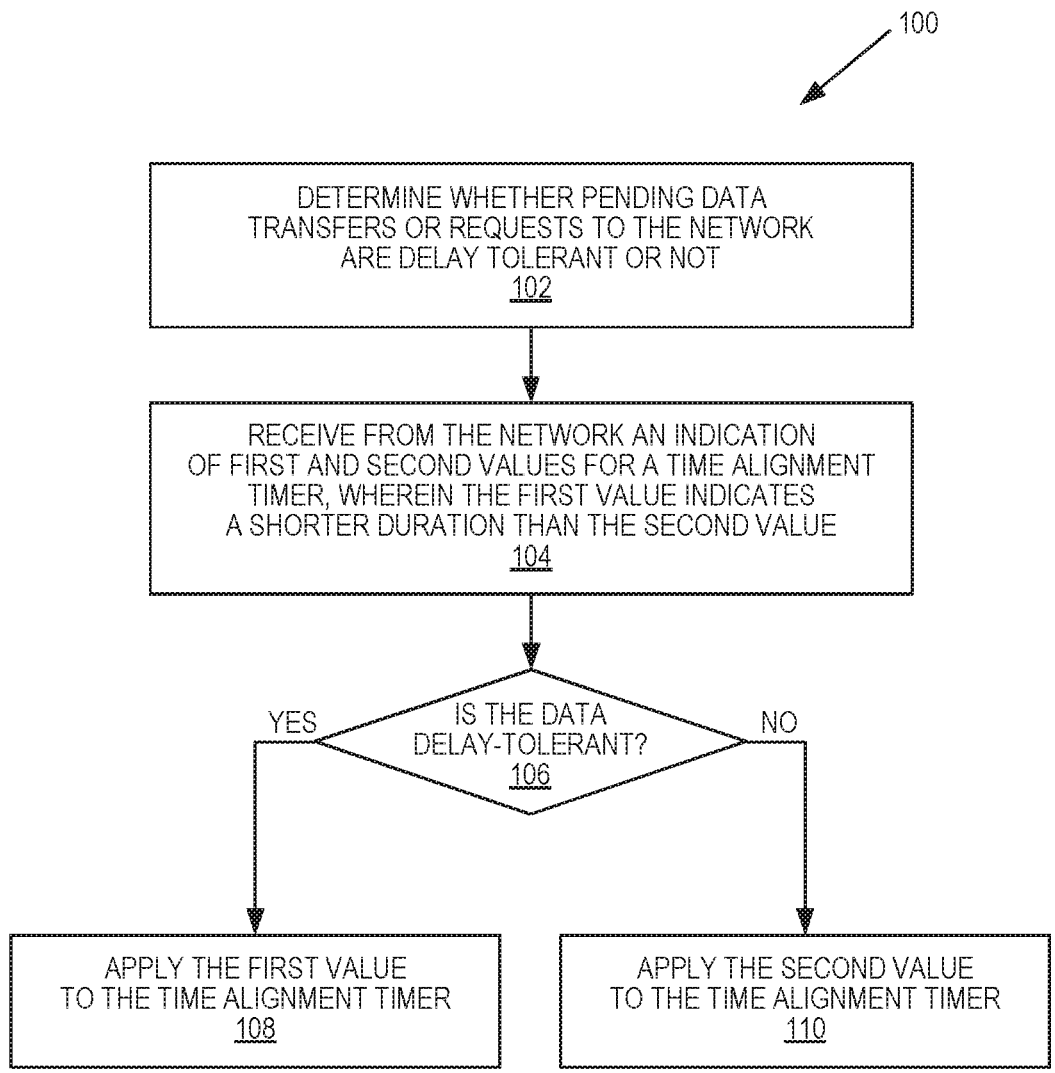
FIG. 11 is flow diagram of a method of operating UE in a wireless communication network.

FIG. 11 is a flow diagram of a method (100) of operating a UE 30 in a wireless communication network. The UE 30 ascertains the delay tolerance of pending data transfers or requests to the network (block 102), and may transmit this information to the network. The UE receives from the network an indication of first and second values for a Time Alignment Timer, wherein the first value indicates a shorter duration than the second value (block 104). The indications may be indices into a table of TAT values, the table being provisioned or transmitted to the UE. If the UL traffic is delay-tolerant (block 106), then the UE applies the first value to the TAT (block 108), and enters a resource conservative mode wherein the UE coalesces data and data requests for delay-tolerant applications. The UE then uses Random Access procedure for infrequent scheduling requests. On the other hand, if the UL traffic is not delay-tolerant (block 106), then the UE applies the second value to the TAT (block 108), and enters normal mode in which it maintains PUCCH UL synchronization, and can schedule UL transmissions with low latency.

Figure 12:
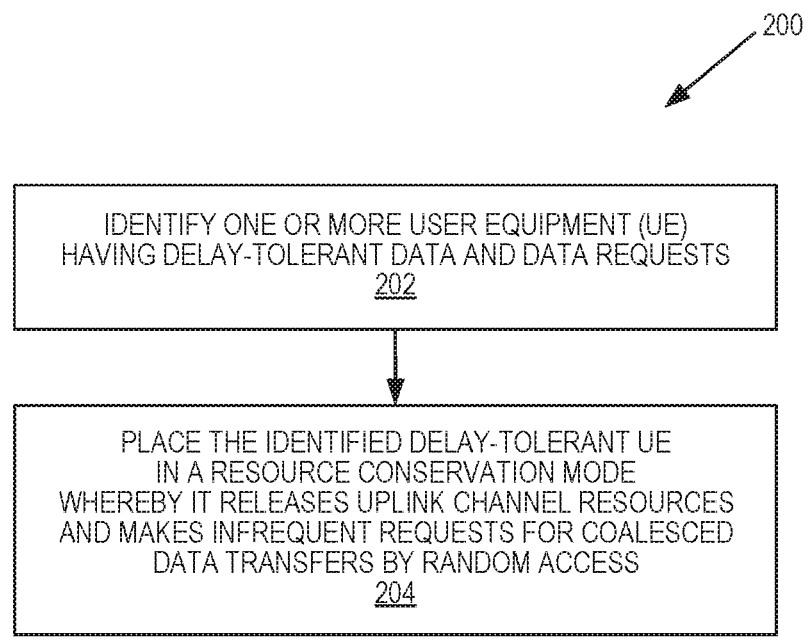
FIG. 12 is a flow diagram of a method of managing signal congestion by a node in a wireless communication network.

FIG. 12 is a flow diagram of a method (200) of managing signal congestion by a node 10 in a wireless communication network. The node 10 identifies one or more UE 30 having delay-tolerant data and data requests. The node 10 places the identified delay-tolerant UE 30 in a resource conservation mode whereby the UE 30 releases uplink channel resources and makes infrequent requests for coalesced data transfers by Random Access.

Figure 13:
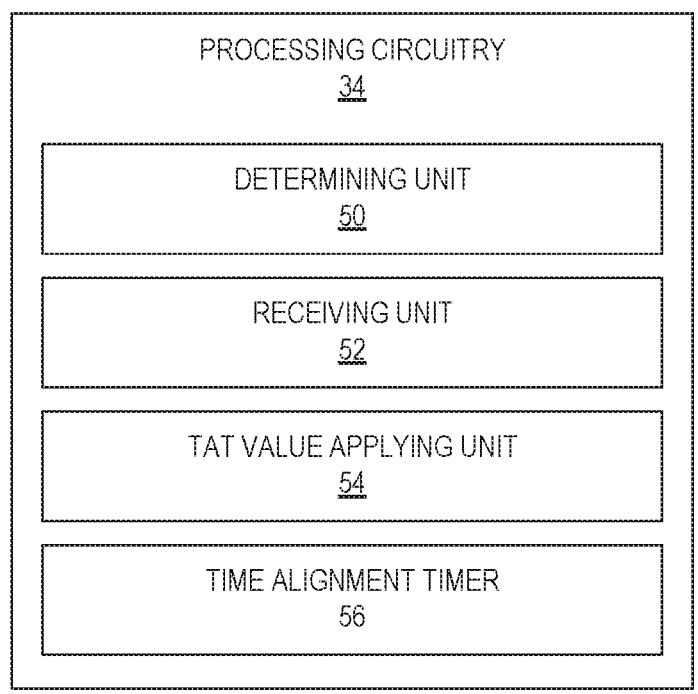
FIG. 13 is block diagram of exemplary processing circuitry in a UE.

FIG. 13 illustrates example processing circuitry 34, such as that in the UE 30 of FIG. 10. The processing circuitry 34 comprises a plurality of physical units. In particular, the processing circuitry 34 comprises a determining unit 50, a receiving unit 52, and a TAT value applying unit 54, and a Time Alignment Timer 56. The determining unit 50 is configured to determine whether pending data transfers or requests to the network are delay-tolerant or not. For example, the determining unit 50 may determine that traffic relating to background tasks or apps is delay-tolerant, and traffic relating to foreground tasks or apps is not delay-tolerant. The receiving unit 52 is configured to receive from the network an indication of first and second values for a Time Alignment Timer, wherein the first value indicates a shorter duration than the second value. The TAT value applying unit 54 is configured to apply the first value to the Time Alignment Timer if the determining unit 50 determines that pending data transfers or requests to the network are delay-tolerant, and further configured to apply the second value to the Time Alignment Timer if the determining unit 50 determines that pending data transfers or requests to the network are not delay-tolerant. The Time Alignment Timer 56 is a programmable or configurable timer, the value of which is set by the TAT value applying unit 54. As well known in the art, upon expiry of the TAT 56, the UE loses UL synchronization, and must schedule transmissions to and from the network via a Random Access procedure on RACH.

Figure 14:
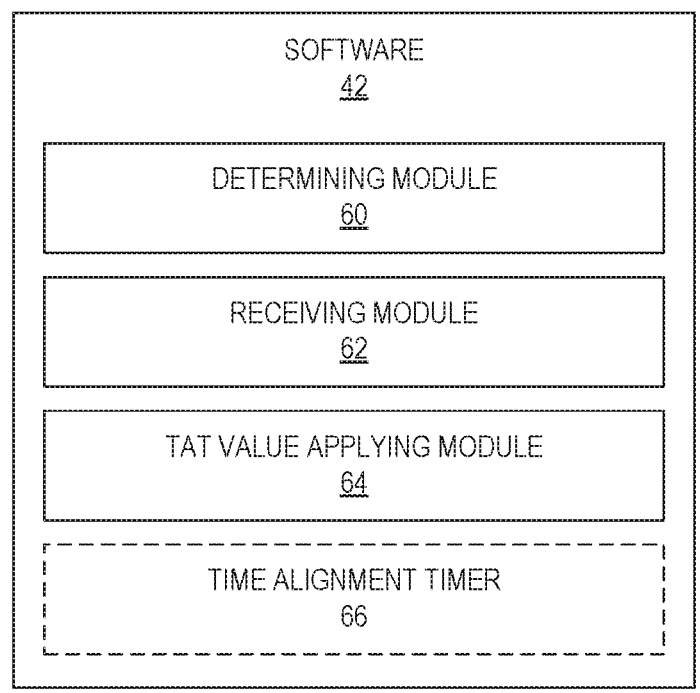
FIG. 14 is a block diagram of exemplary software executed by processing circuitry in a UE.

FIG. 14 illustrates example software 42, such as that depicted in the memory 36 of the UE 30 of FIG. 10. The software 42 comprises a plurality of software modules. In particular, the software 42 comprises a determining module 60, a receiving module 62, and a TAT value applying module 64. In some embodiments (as indicated by dashed lines), a Time Alignment Timer 66 may be implemented as a software module. In other embodiments, the TAT may be a hardware timer. The determining module 60 is configured to determine whether pending data transfers or requests to the network are delay-tolerant or not. For example, the determining module 60 may determine that traffic relating to background tasks or apps is delay-tolerant, and traffic relating to foreground tasks or apps is not delay-tolerant. The receiving module 62 is configured to receive from the network an indication of first and second values for a Time Alignment Timer, wherein the first value indicates a shorter duration than the second value. The TAT value applying module 64 is configured to apply the first value to the Time Alignment Timer if the determining module 60 determines that pending data transfers or requests to the network are delay-tolerant, and further configured to apply the second value to the Time Alignment Timer if the determining module 60 determines that pending data transfers or requests to the network are not delay-tolerant. The Time Alignment Timer 66 is a programmable or configurable timer function, the value of which is set by the TAT value applying module 64. As well known in the art, upon expiry of the TAT 66, the UE loses UL synchronization, and must schedule transmissions to and from the network via a Random Access procedure on RACH.

Embodiments of the present invention present numerous advantages over the prior art. By moving UEs having delay-tolerant data to the non UL synchronized state more rapidly, PUCCH resources are freed up for users that have not indicated a delay-tolerance. The UEs in resource conservation mode coalesce UL data and data requests, and make infrequent UL scheduling requests via Random Access. By providing two TAT timer values, the network has greater flexibility in moving UEs between normal and resource conservation mode. In some embodiments, this can occur autonomously. Furthermore, UEs can request immediate expiry of the TAT timer, thus freeing up network resources even more rapidly and efficiently.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of operating User Equipment in a wireless communication network, comprising:
   determining whether pending data transfers or requests to the network are delay-tolerant or not;
   receiving from the network an indication of first and second values for a Time Alignment Timer, wherein the first value indicates a shorter duration than the second value;
   if the data is delay-tolerant, applying the first value to a Time Alignment Timer; and
   if the data is not delay-tolerant, applying the second value to the Time Alignment Timer.

2. The method of claim 1, wherein ascertaining the delay tolerance of pending data transfers or requests to the network comprises determining whether an application generating the data transfer or request is executing as a background task.

3. The method of claim 1 wherein applying the first or second value to a Time Alignment Timer comprises:
   receiving from the network a Timing Advance Command;
   applying the first or second value to the Time Alignment Timer; and
   restarting the Time Alignment Timer in response to the Timing Advance Command.

4. The method of claim 1 further comprising, if the data is delay-tolerant:
   coalescing data and data requests for delay-tolerant applications; and
   requesting infrequent data transfer scheduling from the network via random access.

5. The method of claim 1 further comprising, if the data is delay-tolerant, treating one of the first value and a derivate of the first value as an internal guard timer to confirm delay-tolerance of data and data requests.

6. The method of claim 1 further comprising notifying the network of whether the first or second value was applied to the Time Alignment Timer.

7. The method of claim 1 further comprising monitoring the delay tolerance of pending data transfers or requests to the network, and notifying the network of a change in data or data request delay tolerance.

8. The method of claim 1 further comprising:
   transmitting a message to the network indicating a desire to stop the Time Alignment Timer;
   receiving a message from the network indicating the UE should act as if the Time Alignment Timer has expired; and
   acting as if the Time Alignment Timer has expired after sending an acknowledgement of the network message.

9. The method of claim 1 further comprising:
   transmitting to the network a request message indicating a desire for a certain first and second values for the Time Alignment Timer; and
   receiving from the network a message indicating the first and second values to use for the Time Alignment Timer.

10. A User Equipment (UE) operative in a wireless communication network, comprising:
    a transceiver operative to exchange signaling and data with the network;
    a Time Alignment Timer; and
    one or more processing circuits operatively connected to the transceiver and operative to execute applications, the processing circuit being further operative to
    determine whether pending data transfers or requests to the network are delay-tolerant or not;
    receive from the network an indication of first and second values for the Time Alignment Timer, wherein the first value indicates a shorter duration than the second value;
    if the data is delay-tolerant, apply the first value to the Time Alignment Timer; and
    if the data is not delay-tolerant, apply the second value to the Time Alignment Timer.

11. The UE of claim 10 wherein the processing circuit is operative to ascertain the delay tolerance of pending data transfers or requests to the network by determining whether an application generating the data transfer or request is executing as a background task.

12. The UE of claim 10 wherein the processing circuit is operative to apply the first or second value to a Time Alignment Timer by:
    receiving from the network a Timing Advance Command;
    applying the first or second value to the Time Alignment Timer; and
    restarting the Time Alignment Timer in response to the Timing Advance Command.

13. The UE of claim 10 wherein the processing circuit is further operative, if the data is delay-tolerant, to:
    coalesce data and data requests for delay-tolerant applications; and request infrequent data transfer scheduling from the network via random access.

14. The UE of claim 10 wherein the processing circuit is further operative, if the data is delay-tolerant, to treat one of the first value and a derivate of the first value as an internal guard timer to confirm delay-tolerance of data and data requests.

15. The UE of claim 10 wherein the processing circuit is further operative to notify the network of whether the first or second value was applied to the Time Alignment Timer.

16. The UE of claim 10 wherein the processing circuit is further operative to monitor the delay tolerance of pending data transfers or requests to the network, and notify the network of a change in data or data request delay tolerance.

17. The UE of claim 10 wherein the processing circuit is further operative to:
transmit a message to the network indicating a desire to stop the Time Alignment Timer;
receive a message from the network indicating the UE should act as if the Time Alignment Timer has expired; and
act as if the Time Alignment Timer has expired after sending an acknowledgement of the network message.

18. The UE of claim 10 wherein the processing circuit is further operative to:
transmit to the network a request message indicating a desire for a certain first and second values for the Time Alignment Timer; and
receive from the network a message indicating the first and second values to use for the Time Alignment Timer.

19. A method of managing signal congestion by a node in a wireless communication network, comprising:
identifying one or more User Equipment (UE) having delay-tolerant data and data requests;
placing the identified delay-tolerant UE in a resource conservation mode whereby it releases uplink channel resources and makes infrequent requests for coalesced data transfers by random access.

20. The method of claim 19 wherein placing the identified delay-tolerant UE in a resource conservation mode comprises sending to the identified delay-tolerant UE first and second values for a Time Alignment Timer, wherein the first value indicates a shorter duration than the second value.

21. The method of claim 19, wherein identifying one or more UEs having delay-tolerant data and data requests comprises receiving from the UE an indication that it has delay-tolerant data and data requests.

22. The method of claim 21, wherein identifying one or more UEs having delay-tolerant data and data requests further comprises sending a Time Alignment Timer value to the UE for use as an internal guard timer to evaluate delay-tolerance.

23. The method of claim 20 further comprising sending to the UE a Timing Advance Command to prompt the UE to apply the first or second Time Alignment Timer value.

24. The method of claim 20 further comprising receiving from the UE an indication of whether the first or second value was applied to the Time Alignment Timer.

25. The method of claim 19 further comprising receiving from the UE a notice of a change in data or data request delay tolerance.

26. The method of claim 20 further comprising:
receiving a message from the UE indicating a desire to stop the Time Alignment Timer; and
sending a message to the UE indicating the UE should act as if the Time Alignment Timer has expired.

27. The method of claim 20 further comprising:
receiving from the UE a request message indicating a desire for a certain first and second values for the Time Alignment Timer; and
sending to the UE a message indicating the first and second values to use for the Time Alignment Timer.

28. A node operative in a wireless communication network, comprising:
a transceiver operative to exchange signaling and data with at least one User Equipment (UE);
one or more processing circuits operatively connected to the transceiver and operative to
identify one or more User Equipment (UE) having delay-tolerant data and data requests; and
place the identified delay-tolerant UE in a resource conservation mode whereby the UE releases uplink channel resources and makes infrequent requests for coalesced data transfers by random access.

29. The node of claim 28 wherein the processing circuit is operative to place the identified delay-tolerant UE in a resource conservation mode by sending to the identified delay-tolerant UE first and second values for a Time Alignment Timer, wherein the first value indicates a shorter duration than the second value.

30. The node of claim 28, wherein the processing circuit is operative to identify one or more UEs having delay-tolerant data and data requests by receiving from the UE an indication that it has delay-tolerant data and data requests.

31. The node of claim 30, wherein the processing circuit is further operative to identify one or more UEs having delay-tolerant data and data requests further by sending a Time Alignment Timer value to the UE for use as an internal guard timer to evaluate delay-tolerance.

32. The node of claim 29 wherein the processing circuit is further operative to send to the UE a Timing Advance Command to prompt the UE to apply the first or second Time Alignment Timer value.

33. The node of claim 29 wherein the processing circuit is further operative to receive from the UE an indication of whether the first or second value was applied to the Time Alignment Timer.

34. The node of claim 28 wherein the processing circuit is further operative to receive from the UE a notice of a change in data or data request delay tolerance.

35. The node of claim 29 wherein the processing circuit is further operative to:
receive a message from the UE indicating a desire to stop the Time Alignment Timer; and
send a message to the UE indicating the UE should act as if the Time Alignment Timer has expired.

36. The node of claim 29 wherein the processing circuit is further operative to:
receive from the UE a request message indicating a desire for a certain first and second values for the Time Alignment Timer; and
send to the UE a message indicating the first and second values to use for the Time Alignment Timer.

* * * * *

UNITED STATES PATENT AND TRADEMARK OFFICE
CERTIFICATE OF CORRECTION

PATENT NO. : 10,009,789 B2
APPLICATION NO. : 15/115447
DATED : June 26, 2018
INVENTOR(S) : Bergquist et al.

Page 1 of 1

It is certified that error appears in the above-identified patent and that said Letters Patent is hereby corrected as shown below:

In the Specification

In Column 1, Line 61, delete "Radio Link Protocol" and insert -- Radio Link Control --, therefor.

In Column 1, Line 62, delete "Medium Access Protocol" and insert -- Medium Access Control --, therefor.

Signed and Sealed this
Twenty-fifth Day of September, 2018

Andrei Iancu
*Director of the United States Patent and Trademark Office*